US006841645B1

(12) United States Patent
Dromard et al.

(10) Patent No.: US 6,841,645 B1
(45) Date of Patent: Jan. 11, 2005

(54) PEROXIDISED POLYORGANOSILOXANES (POS), ONE OF THE METHODS FOR PREPARING THEM AND THEIR USES AS BLEACHING AGENT IN DENTAL COMPOSITIONS

(76) Inventors: Adrien Dromard, 24, rue Vendome, Lyons (FR), F-69006; Gérard Mignani, 2, Ave. des Frères Lumière, Lyons (FR), F-69008; Lucile Gambut, 71, rue Ney, Lyons (FR), F-69006; Frédéric Dallemer, 7, cours Gambetta, Lyons (FR), F-69003

( * ) Notice: Subject to any disclaimer, the term of this patent is extended or adjusted under 35 U.S.C. 154(b) by 0 days.

(21) Appl. No.: 09/857,578

(22) PCT Filed: Dec. 1, 1999

(86) PCT No.: PCT/FR99/02984

§ 371 (c)(1),
(2), (4) Date: Aug. 27, 2001

(87) PCT Pub. No.: WO00/34360

PCT Pub. Date: Jun. 15, 2000

(30) Foreign Application Priority Data

Dec. 9, 1998 (FR) ........................................ 98 15715

(51) Int. Cl.[7] ........................................ C08G 77/04

(52) U.S. Cl. ........................ 528/24; 510/116; 510/375; 510/466; 510/506

(58) Field of Search ................................ 510/375, 466, 510/506, 116; 528/10

(56) References Cited

U.S. PATENT DOCUMENTS 3,726,943 A 4/1973 Joy ............................ 260/827

FOREIGN PATENT DOCUMENTS

GB 897.973 6/1962

OTHER PUBLICATIONS

Patent Abstracts of Japan vol. 012, no. 279 (C–517), Aug. 1, 1998, & JP 63 057643 A (Nippon Oil & Fats Co. Ltd.) Mar. 12, 1988.

International Search Report.

*Primary Examiner*—Gregory R. Del Cotto

(57) ABSTRACT

The invention concerns polyorganosiloxanes (POS) grafted with peroxide functions and functions stabilizing the latter. Said stabilized peroxidised POS are designed to form a novel oxidizing system useful as bleaching agents, for example or dental or detergent compositions. The invention aims at and succeeds in providing peroxygenated bleaching agents more stable and more efficient than those known in prior art. The inventive stabilized and peroxidised POS correspond for example to the formula (a). The invention also concerns a method for making said peroxidised POS, the precursors thereof and their uses as bleaching agents in dental compositions (toothpaste or detergent compositions).

9 Claims, No Drawings

PEROXIDISED POLYORGANOSILOXANES (POS), ONE OF THE METHODS FOR PREPARING THEM AND THEIR USES AS BLEACHING AGENT IN DENTAL COMPOSITIONS

This application is an application under 35 U.S.C. Section 371 International Application Number PCT/FR99/02984 filed on Dec. 1, 1999.

The field of the invention is that of peroxide-comprising systems which can be applied in particular in bleaching, disinfecting, cleaning or the initiation of polymerizations (for example radical polymerization) or of epoxidation reactions. The oxidizing properties of these systems are more particularly valued in bleaching applications, in particular dental (e.g. dentifrice) or detergent applications.

The peroxide-comprising systems targeted in the context of the present account are functionalized polymers.

The present invention relates to peroxide-comprising polyorganosiloxanes (POS) and to one of their processes of preparation.

The invention also relates to silicone precursors of these peroxide-comprising POSs.

Finally, the present invention comprises an application aspect which comprises the use of peroxide-comprising POSs according to the invention as active ingredient in bleaching, disinfecting, cleaning and the initiation of chemical reactions. More specifically, the invention is targeted at dental compositions, for example dentifrices, or detergent compositions comprising peroxide-comprising POSs as bleaching agent.

The use is known of hydrogen peroxide $H_2O_2$ or its persalts (calcium peroxides, perborates, percarbonates) in the field of bleaching, in particular dental bleaching. In the continuation of the present account $H_2O_2$ will denote $H_2O_2$ as such or its persalts. The disadvantages of hydrogen peroxide are not insignificant. Firstly, $H_2O_2$ has to be employed at a high concentration to be effective. This point is particularly annoying because of the aggressiveness of $H_2O_2$. Secondly, it is known that the bleaching action is related to the oxygen-donating effect. In point of fact, this effect is not the predominant effect which can be obtained with hydrogen peroxide. The latter behaves essentially as a promoter of deleterious free radicals which do not participate in the bleaching function and which instead would even have a tendency to interfere with it. Thirdly, hydrogen peroxide has the disadvantage of being unstable.

There thus exists a clearly identified need for a substitute of hydrogen peroxide for these applications in the field of bleaching and in particular of dental bleaching (dentifrices).

In attempting to solve the problem targeted above, U.S. Pat. No. 5,698,326 has provided peracid compounds composed of an inorganic support formed of silica which carries peracid functionalities. These compounds can be obtained by reacting silica substituted by a siloxylalkylamino residue with a trimellitic anhydride, the carboxylic functional group of the benzyl nucleus of which is subsequently oxidized to convert it to a peracid functional group. This corresponds to the following formula:

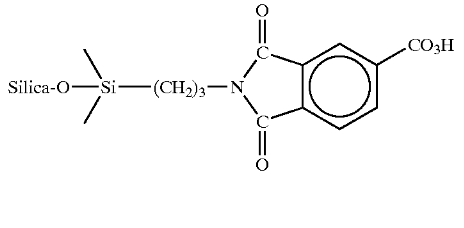

According to this patent, the grafting of the peracid functional group to the inorganic support made of silica is sensible to make possible stabilization of the peracid functional group. In reality, it turns out that this stability might be further improved. In addition, there is reason to fear that these peroxide-comprising silicas are difficult to disperse in relatively viscous compositions, such as dentifrices. European patent application No. 796 874 relates to a process for the preparation of polymers comprising peroxycarboxylic groups. These peroxycarboxylic polymers are more specifically N-vinylpyrrolidone/maleic anhydride copolymers. Hydrogen peroxide, which is reacted with this copolymer, makes it possible to convert carboxyls resulting from anhydride to peroxycarboxylic functional groups. The performance of these peroxycarboxylated copolymers in terms of bleaching was not revealed by this patent application. Furthermore, it seems that, in the dental bleaching application, peroxycarboxylated copolymers lack selectivity with regard to teeth. In addition, problems of instability may be feared for dental bleaching applications of these copolymers.

Patent application PCT WO 97/02 011 discloses dental oral compositions comprising conventional ingredients, such as abrasives, binders, humectants, surfactants, sources of fluorine ions or other sweeteners and two other essential ingredients, namely, first, an aminoalkylsilicone, such as a polydimethylsiloxane comprising aminoalkyl units of the propylaminoethylamine type in the chains and at their ends, and, secondly, a polydimethylsiloxane comprising pendant groups of polyoxyethylene and/or polyoxypropylene type having a surfactant action.

No mention is made in this document of polyorganosiloxanes functionalized by peroxide units. This oral composition is presented as having improved antiplaque and antibacterial properties, which complement an excellent cleaning performance. This oral composition can also comprise bleaching agents belonging to the family of inorganic peracid salts (metal persulfates, perborates, percarbonates and peroxides).

These oral compositions are not satisfactory as regards stability, toxicity, selectivity with respect to teeth and effectiveness of bleaching by oxidation.

In such a state of the art, one of the essential objects of the inventors was to develop a novel oxidizing system which can be used in particular in bleaching, for example dental or detergent bleaching, in disinfection, in cleaning or in the initiation of chemical reactions, this oxidizing system of peroxide-comprising type having to be more stable and more effective than the known systems of the prior art.

Another essential object of the invention is to provide a peroxide-comprising bleaching system, in particular for dental bleaching applications, which makes it possible to control the reactivity of the peroxide functional group, so as to limit as much as possible its conversion to aggressive free radicals.

Another essential object of the invention is to provide a peroxide-comprising bleaching system which can be used in particular in dental bleaching and which has a significantly improved stability on storage.

Another essential object of the invention is to provide a peroxide-comprising bleaching system, applied in dental bleaching (oral composition for the treatment and maintenance of the teeth), having a better selectivity with respect to teeth to be bleached.

Another essential object of the invention is to provide a peroxide-comprising oxidizing system capable of being used as a system for the controlled release of oxidizing peroxide functional groups, indeed even of free radicals which initiate chemical reactions.

Another essential object of the invention is to provide a process for the production of the abovementioned peroxide-comprising oxidizing system which is simple to employ and economic.

Another essential object of the invention is to stipulate the use of the peroxide-comprising oxidizing system targeted above as bleaching agent, as disinfecting agent, as cleaning agent or as agent for the initiation of chemical reactions.

Another essential object of the invention is to provide a dental composition possessing an effective, stable and selective bleaching agent.

Another essential object of the invention is to provide a detergent composition comprising an effective, stable and economic bleaching agent.

These objects, among others, are achieved by the present invention, which relates to novel polyorganosiloxanes (POSs) comprising siloxane units of following formula (I):

$$R_aE_bG_cSiO_{\frac{4-(a+b+c)}{2}} \qquad \text{(I)}$$

in which

- a+b+c=0 to 3
- a, b, c=0 to 3
- R corresponds to one or more identical or different radicals, R being chosen from monovalent hydrocarbonaceous groups, preferably from linear, branched and/or cyclic alkyls and/or aryls, and more preferably still from linear or branched $C_1$–$C_4$ alkyls and phenyl, xylyl and tolyl groups;
- E corresponds to one or more monovalent functional substituents, which are identical to or different from one another, carrying one or more peroxo(—O—O—) functional groups Fpo and each optionally comprising one or more Fpo-stabilizing functional groups Fstab which are identical to or different from one another and are chosen from functional groups capable of bonding via weak bonds with Fpo functional groups;
- G corresponds to one or more functional substituents, identical to or different from one another, each comprising one or more Fpo-stabilizing functional groups Fstab which are identical to or different from one another and are chosen from functional groups capable of bonding via weak bonds with the Fpo functional groups;

with the conditions according to which:

(i). the concentration of [Fpo] functional groups, expressed by the ratio $$\frac{Fpo \text{ number}}{\text{Total number of silicon atoms in the } POS}$$

is defined as follows:

| | |
|---|---|
| Δ | 0 < [Fpo] |
| Δ preferably | 0.01 ≦ [Fpo] ≦ 1.0 |
| Δ and more preferably still | 0.1 ≦ [Fpo] ≦ 0.6, |

(ii). the concentration as mol % of T siloxane units (a+b+c=1) and/or Q siloxane units (a+b+c=0) is defined as follows:

| | |
|---|---|
| Δ | 0 ≦ [T and/or Q] ≦ 20 |
| Δ preferably | 0 ≦ [T and/or Q] ≦ 10 |
| Δ and more preferably still | 0 ≦ [T and/or Q] ≦ 8. |

These novel peroxide-comprising POSs make it possible to stabilize the peroxo functional group and to control its oxidizing activity by restraining its activity for the production of free radicals. In addition, their bleaching and selectivity properties with respect to teeth make them particularly appropriate and effective bleaching systems for oral dental compositions, such as dentifrices.

This is because these silicones, functionalized by peroxo Fpos, have a specific affinity with respect to constituent materials of the teeth (in particular hydroxyapatite), so that they are selected vectors capable of conveying the chemical bleaching functional groups onto the teeth. It is obvious that this optimizes the effectiveness of said functional groups. It follows that it is possible to reduce the doses, which is entirely favorable to decreasing the aggressiveness of the bleaching agent.

Furthermore, these peroxide functionalized silicones are hydrophobic and thus have the advantage of protecting the Fpo functional groups from water, which is a major component in the instability of the Fpo functional groups.

The novel peroxide-comprising polyorganosiloxanes comprising Fpo functional groups can be linear and/or branched and/or crosslinked polymers according to the percentage by weight of DTQ siloxyl units which they comprise. Preferably, the peroxide-comprising POSs according to the invention predominantly comprise D units (a+b+c=2) and more preferably still are linear.

Advantageously, the E substituents of the siloxane units (I) are identical to or different from one another are chosen from (cyclo)aliphatic and/or aromatic and/or heterocyclic hydrocarbonaceous groups optionally comprising one or more heteroatoms, preferably O, N, S or Si, it being possible for these groups optionally to be substituted.

In just as advantageous a way, Fpo is included:

either in an acyl peroxide:

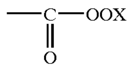

with X corresponding to H, to $R^x$, representing an aliphatic and/or alicyclic and/or aromatic and/or heterocyclic monovalent hydrocarbonaceous radical, that is to say comprising, inter alia, hydrogen and carbon atoms, optionally comprising one or more heteroatoms (N, O, S and the like), it being possible for this radical optionally to be substituted and it being possible for $R^x$ optionally to correspond to the same definition as that given above for R in the formula (I), to a halogen, preferably chlorine, or to a cation which makes it possible to form a salt with the peroxo anion and which is preferably chosen from the elements from columns Ia and IIA of the Periodic Table, or in a peroxide residue comprising sulfur, phosphorus, silicon or boron as oxygen carrier.

In other words, each peroxo functional group Fpo belongs to a peroxycarboxylic residue (acids, esters, halides, chlorides or salts) or alternatively a peroxide residue deriving from compounds comprising sulfur, phosphorus, boron or silicon.

It can be, e.g.:

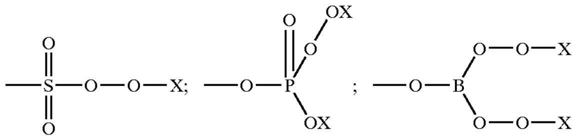

with X as above.

Mention may be made, as examples of X groups which are alkyls, of: methyl, ethyl, propyl or butyl.

Mention may be made, as examples of X groups which are cations, of: $Na^+$, $K^+$, $Ca^{++}$, $Mg^{++}$, and the like.

These peroxycarboxylic and noncarboxylic residues are connected to the silicon of the POS chain via an aliphatic and/or alicyclic and/or aromatic and/or heterocyclic hydrocarbonaceous linking unit (that is to say, comprising in particular carbon and hydrogen atoms) optionally comprising one or more heteroatoms: N, O, S, and the like, optionally.

The assemblage comprising:

first, the peroxycarboxylic residue and/or the noncarboxylic peroxy, and, secondly, the linking unit, form the functional substituent E.

In practice, the linking unit is, for example, of the -alkyl-O-aryl (benzyl), -alkyl anhydride or -alkylimide-aryl (benzyl) type, inter alia.

The advantageous stabilizing action of the Fstabs on the Fpos is a preferred characteristic of the functionalized POSs according to the invention. In accordance with the latter, the Fstabs are located on the (pendant) functional substituents E and/or G. Without this being limiting, it is preferable for the Fstabs to be carried at least by the E group or groups, so as to be close to the Fpos to be stabilized. It is not excluded to consider that the stabilizing effect of the Fstab is thus improved.

According to a preferred characteristic of the invention, the optional stabilizing functional groups Fstab of the-E and/or G substituents of the formula (I) correspond to functional groups which can generate weak bonds (hydrogen bonds, e.g.) with Fpo and which are selected from the group consisting of:

functional units comprising nitrogen and/or oxygen and/or fluorine and/or sulfur and/or phosphorus; carboxylic, carboxylate, amide, imide, sulfonamide, hydroxyl, alkoxy, amine or organofluorinated units being preferred;

cationic units, preferably those comprising one or more quaternary ammoniums;

chelating units comprising one or more ether functional groups and/or one or more amine functional groups, and/or phosphonate and/or sulfonate chelating units.

The optional functional substituents G each comprise, in addition to the Fstab group or groups, a linking unit which provides for the bonding with a silicone chain. The linking units of the G substituents are identical to or different from one another, which correspond to the same definition as that given above for the linking units of the E substituents.

The peroxide-comprising POSs forming the subject matter of the invention can be obtained:

either from chlorosilanes or from alkoxysilanes carrying the E substituents, from chlorosilanes or from alkoxysilanes carrying G substituents and from chlorosilanes or from alkoxysilanes carrying the R substituents and/or hydrogen, by cohydrolysis, polycondensation and polymerization of the hydrolyzed products in the presence of cyclic diorganosiloxanes or redistribution in the presence of polydiorganosiloxanes, and the like, or from functionalized polydiorganosiloxanes by hydrosilylation of hydrogenated polydiorganosiloxanes using complete or partial olefinic precursors of the functional substituents E and G.

Within the meaning of the present account, the terms "complete or partial olefinic precursors" correspond respectively:

to the case where the olefinic precursor is in the final form and does not have to be subjected to other grafting operations to result in the complete substituent which will be converted to E or G after peroxidation (complete linking unit), and to the case where the linking unit of the E or G substituents is formed by several members placed end to end and corresponding to intermediate synthetic forms, the olefinic precursor constituting the first member, which is bonded, first, to the silicone chain and, secondly, to the following member of the linking unit.

Without this being limiting, preference is given, in accordance with the invention, to peroxide-comprising POSs obtained by hydrosilylation of olefinic precursors of E and G substituents. These hydrosilylation reactions can be carried out at a temperature of the order of 15 to 200° C., preferably of the order of 20 to 100° C., in the presence of a catalyst based on a metal from the platinum group. Mention may in particular be made of the complex platinum derivatives disclosed in U.S. Pat. Nos. 3,715,334, 3,775,452, 3,814,730, 3,159,601 and 3,159,662. The amounts of platinum catalysts employed are of the order of 1 to 300 parts per million, expressed as metal, with respect to the reaction medium. The olefinic precursors employed in these hydrosilylations advantageously do not comprise the Fpo peroxo functional groups but their non-peroxygenated forms F'po or any intermediate form of the latter. It is preferable, in accordance with the invention, to provide for protection of the F'po precursor functional groups before the hydrosilylation. The POSS, grafted by hydrosilylation and carrying F'po precursor functional groups, are optionally purified and then subjected to oxidation, which makes possible the conversion of the F'po functional groups to Fpo functional groups.

According to a preferred embodiment of the invention, the peroxide-comprising POSs correspond to the formula (II) given below:

$$R^1{}_3SIO—[SiR^2{}_2O]_m—[SiR^2EO]_n—[SiR^2GO]_o—SiR^3{}_3 \quad (II)$$

in which:

$R^1$ and $R^3$ independently representing a hydrogen, a hydroxyl or a monovalent residue corresponding to the same definition as that given for R above;

$R^2$ independently represent hydrogen, a hydroxyl or a monovalent residue corresponding to the same definition as that given for R above;

| | |
|---|---|
| • | $2 \leqq m+n+o \leqq 300$ |
| • preferably | $3 \leqq m+n+o \leqq 50$ |
| • and more preferably still | $5 \leqq m+n+o \leqq 20$ |
| • | $0 \leqq m \leqq 200$ |
| • preferably | $1 \leqq m \leqq 100$ |
| • and more preferably still | $1 \leqq m \leqq 10$ |
| • | $0 \leqq n \leqq 50$ |
| • preferably | $1 \leqq n \leqq 10$ |
| • and more preferably still | $2 \leqq n \leqq 4$ |
| • | $0 \leqq o \leqq 50$ |
| • preferably | $1 \leqq o \leqq 10$ |
| • and more preferably still | $2 \leqq o \leqq 4.$ |

More preferably still, the polyorganosiloxanes are characterized in that:

$R^1$ and $R^3=C_1–C_3$ alkyl, preferably $—CH_3$ $R^2=C_1–C_3$ alkyl, preferably $—CH_3$ the functional substituent or substituents E simultaneously comprise Fpo and Fstab functional groups.

In practice, without this being limiting, the functional substituents E of the peroxide-comprising POSs each comprise a linking unit comprising at least one bicarboxylated and/or benzoxylated and/or imide unit.

The case where the linking unit or units of the functional substituent or substituents E comprise at least one bicarboxylic unit corresponds to a preferred form of the invention in which the Fpo functional group is obtained from an anhydride which is converted, on the one hand, to Fpo and, on the other hand, to Fstab carboxylic functional group for stabilization of the neighboring Fpo.

The peroxide-comprising POSs according to the invention are stable and exhibit a high bleaching power.

According to another of its aspects, the present invention relates to a process for the preparation of the POSs as defined above. This process is characterized in that it consists essentially in oxidizing the polysiloxane precursors of the targeted peroxide-comprising POSs. This oxidation is carried out using at least one oxidizing agent preferably chosen from the group consisting of:

$H_2O_2$, $O_2$, $O_3$ and their mixtures.

These -POS precursors are distinguished from the targeted peroxide-comprising POSs in that they comprise one or more F'po functional groups which are Fpo precursors and are composed:

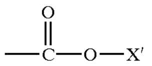

of carboxyl residues:

with X' corresponding to the same definition as that given for X above;

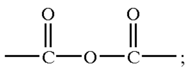

and/or of acid anhydride residues:

and/or of aldehyde residues;

and/or of residues comprising sulfur, phosphorus, silicon or boron.

These ester or anhydride functional groups of the -POS precursors can be terminal functional groups or functional groups which are included within a ring.

As is indicated above, the polysiloxane precursors comprising F'po functional groups can be obtained by cohydrolysis of nonfunctionalized chlorosilanes and alkoxysilanes and of chlorosilanes or alkoxysilanes functionalized by E and G substituents. The stage which follows the cohydrolysis can be a polycondensation and a polymerization of the hydrolysis products, in the presence of cyclic diorganosiloxanes, or a stage of redistribution in the presence of polydiorganosiloxanes. These conventional syntheses of POS by cohydrolysis/polycondensation/polymerization or by cohydrolysis/redistribution are described in particular in W. Nell, "Chemistry and Technology of Silicones", published by Academic Press, 1968.

According to a preferred alternative, the starting materials used can be hydrogenated polyorganosiloxanes which can be functionalized by reacting them according to a hydrosilylation reaction (addition with olefinic precursors of the E and G substituents). Reference will be made above for further details with regard to this hydrosilylation.

According to a preferred characteristic of the invention, the -POS precursors which are subjected to oxidation to produce targeted peroxide-comprising POSs are selected from POSs carrying functional substituents E:

anhydride substituents and/or carboxyl substituents, preferably benzoyl substituents, and/or aldehyde substituents, preferably benzaldehyde substituents, and/or sulfonyl substituents, and/or phosphoryl substituents, and/or siloxyl substituents, and/or boroxide substituents.

More preferably still, the -POS precursors selected:

carry anhydride E groups, the oxidation being carried out using $H_2O_2$ in the presence of a catalyst of strong base type, preferably potassium hydroxide, and/or carry carboxylic E groups, preferably benzoyl groups, the oxidation being carried out using $H_2O_2$ in the presence of a catalyst of strong acid type.

In accordance with the invention, it turned out to be particularly advantageous for the -POS precursors to exhibit, before the oxidation stage which makes possible the conversion of the F'po groups to Fpo groups, a molar purity $\geqq 90\%$, preferably $\geqq 95\%$.

In practice, this purification stage is carried out by any known appropriate method, such as, for example, devolatilization or fractional precipitation from an organic solvent, such as methanol.

As regards more specifically the oxidation stage, it is seen that the oxidizing agents can be hydrogen peroxide, oxygen, ozone and their mixtures.

In the case where the oxidizing agent is composed of hydrogen peroxide, the catalyst employed can be a strong base, for example an inorganic base, such as KOH or NaOH, or alternatively a strong acid, for example an inorganic acid, such as $H_2SO_4$, or an organic acid, such as $MeSO_3H$. The solvents employed in these scenarios are, for example, ethyl acetate or $MeSO_3H$.

When the oxidizing agent is oxygen, the use can be envisaged of a catalyst comprising $CO^{2+}$.

In practice, this oxidation stage can take place at ambient temperature and at ambient pressure.

Another subject matter of the present invention is the POS precursors comprising a F'po precursor functional group as defined above. These novel POS precursors as such constitute intermediates of the process according to the invention.

Finally, the present invention relates to the use of the peroxide-comprising POSs as defined above as:

bleaching agent, and/or disinfecting agent, and/or cleaning agent, and/or polymerization initiating agent, and/or agent for epoxidation.

The peroxide-comprising POSs according to the invention are particularly suitable as bleaching agent and more particularly still as agent for bleaching the teeth, due to their properties of selectivity with respect to teeth, of nontoxicity, of controlled reactivity of the Fpo peroxide functional groups (limitation of the production of free radicals), of nontoxicity and of high effectiveness at a low dose.

The result of this is that another subject matter of the present invention is a dental composition (for example an oral composition), in particular a dentifrice, characterized in that it comprises peroxygenated POSs as defined above as bleaching agent.

Without this being limiting, a few details may be given which define, qualitatively and quantitatively, the dental composition according to the invention by indicating that the latter comprises:

peroxygenated POSs in the proportion of 0.1 to 40% by weight, preferably of 0.1 to 10% by weight, and more preferably still of the order of 1 to 5% by weight;

polishing abrasives in a proportion of 5 to 40% by weight, preferably of 5 to 35% by weight, it being possible for these abrasives to be in particular silica, precipitated calcium carbonate, magnesium carbonate, calcium phosphates, titanium, zinc or tin oxides, talc, kaolin, abrasive particles comprising a core of calcic material, preferably made of calcium carbonate, and a shell of idrophobic product, preferably a fatty acid salt and more preferably still a Na stearate;

one or more fluorinated compounds corresponding to a concentration of the order of 0.005 to 2%, preferably 0.1 to 1%, by weight of fluorine in said composition, it being possible for these fluorinated compounds to be in particular salts of monofluorophosphoric acid, in particular those of sodium, potassium, lithium, calcium, aluminum and ammonium, or alkali metal fluorides, in particular sodium fluoride;

optionally anionic, nonionic, amphoteric or zwitterionic surface-active agents, in the proportion of approximately 0.1 to 10%, preferably of approximately 1 to 5%, of the weight of said composition; mention may be made, by way of examples, of:

- anionic surfactants, such as the sodium, magnesium, ammonium or ethanolamine salts of
  - $C_8$–$C_{18}$ alkyl sulfates which can optionally comprise up to 10 oxyethylene and or oxypropylene units (in particular sodium lauryl sulfate)
  - $C_8$–$C_{18}$ alkyl sulfoacetates (in particular it, sodium lauryl sulfoacetate)
  - $C_8$–$C_{18}$ alkyl sulfoacetates (in particular sodium dioctyl sulfosuccinate)
  - $C_8$–$C_{18}$ alkyl sarcosinates (in particular sodium lauryl sarcosinate)
  - $C_8$–$C_{18}$ alkyl phosphates which can optionally comprise up to 10 oxyethylene and/or oxypropylene units
  - $C_8$–$C_{18}$ alkyl ether carboxylates comprising up to 10 oxyethylene and/or oxypropylene units
  - sulfated monoglycerides, and the like
- nonionic surface-active agents, such as optionally polyethoxylated fatty esters of sorbitan, ethoxylated fatty acids, polyethylene glycol esters or polyether fatty alcohols,
- amphoteric surface-active agents, such as betaines or sulfobetaines optionally water in a proportion of approximately 0.1 to 50%, preferably approximately 0.5 to 40%, of the weight of said composition optionally humectants, in the proportion of approximately 10 to 85%, preferably of 10 to 70%, of the weight of said composition, humectants such as glycerol, sorbitol, polyethylene glycols, lactilol, xylitol, and the like optionally thickening agents, such as some silica used for this purpose (Tixosil 43®, sold by Rhône-Poulenc, and the like), in a proportion of 5 to 15% by weight, and/or polymers, used alone or in combination, such as xanthan gum, guar gum, cellulose derivatives (carboxymethylcellulose, hydroxyethylcellulose, hydroxypropylcellulose, hydroxypropylmethylcellulose, and the like), crosslinked polyacrylates, such as the Carbopol® products distributed by Goodrich, alginates or carrageenans, or Viscarin®, in a proportion of 0.1 to 5% by weight optionally bactericidal, antimicrobial or antiplaque therapeutic agents, such as zinc citrate, polyphosphates, guanidines, bisbiguanides or other therapeutic cationic organic compound optionally flavorings (essence of aniseed, of Chinese anise, of mint, of juniper, cinnamon, clove or rose), sweeteners, colorings (chlorophyll), preservatives, and the like.

The dentifrice composition forming the subject matter of the invention can be provided:

in various forms (pastes, gels or creams) prepared using conventional processes, and in various packagings (e.g. single- or twin-compartment).

The peroxide-comprising or peroxygenated POSs according to the invention are not suitable only for the bleaching and cleaning of the teeth. This is because they have proved to be entirely effective as bleaching agents in detergent compositions. Another subject matter of the present invention is thus detergent compositions comprising peroxygenated or peroxide-comprising POSs according to the invention as defined above as bleaching agents.

The present [lacuna] will be better understood with the help of the following nonlimiting examples which also reveal some of the advantages and the alternative embodiments of the invention. The preparation of the precursor POSs of the peroxide-comprising POSs according to the invention, the conversion by oxidation of these precursors to peroxide-comprising POSs and the evaluation of the latter in terms of stability on storage and of bleaching power are presented in these examples.

EXAMPLES

Example 1

Preparation of a -POS precursor (B) of a peroxide POS According to the Invention, this Precursor Being a Polydimethylsiloxane Comprising Trimethylsilyl Ends Carrying Functional Substituents of -propyl-oxy-benzoic Type Starting silicone oil:

structure A

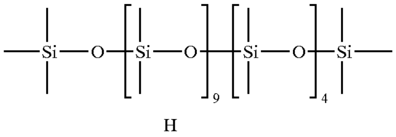

Final silicone oil:

structure B

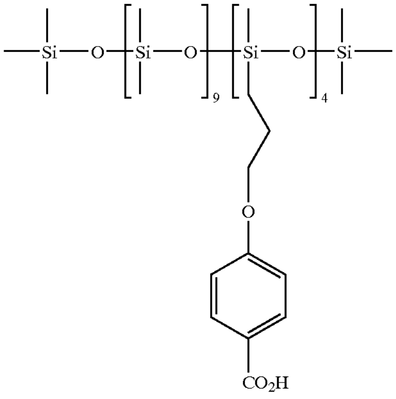

1.1. Synthesis of Allyloxybenzoic Acid 500 ml of distilled water, 5 1 of absolute ethanol and, gradually, 450.9 g of potassium hydroxide (8.02 mol) are charged with vigorous stirring (240 rev/min) to a 10 1 reactor, under an argon head space, equipped with a reflux condenser, a dropping funnel, a mechanical stirrer and thermometer probe. Once the potassium hydroxide has dissolved, 558.3 g of 4-hydroxybenzoic acid (4.04 mol) are charged. The reaction mass becomes cloudy and then becomes clear. Allyl bromide (489.0 g, i.e. 4.04 mol) is then run in over 2 h at ambient temperature. After the allyl bromide has been run in, the reaction medium is brought to 80° C. for 17 hours.

After returning to ambient temperature, the reaction medium is neutralized by gradual addition over 1 h 30 of 1 l of 36% hydrochloric acid (11 mol). The reaction medium becomes milky and is filtered through a sintered glass No. 4 under vacuum. A white filtration cake is obtained and is washed with water (250 ml).

The allyloxybenzoic acid which is found in the filtration cake is purified by recrystallization. The filtration cake, 5 l of absolute ethanol and 750 ml of distilled water are charged to the 10 l reactor. The reaction mass is brought to reflux (80° C.) and distilled water is gradually added until a single clear phase is obtained, i.e. 1.75 l of distilled water. The reaction mass is then decanted into a 10 l receptacle which is cooled with ice. The medium is allowed to recrystallize for 16 h and then filtration is carried out through a sintered glass No. 4 under vacuum. The cake is washed with distilled water (2 l, used over three occasions). Crystals are obtained and are dried under a 200 mmHg vacuum at 70° C. The yield is 35%.

1.2. Protection of Allyloxybenzoic Acid by a Trimethylsilyl Group 53.62 g of allyloxybenzoic acid, prepared in 1.1. (0.3 mol), are introduced into a 250 ml three-necked flask, under an argon head space, equipped with a reflux condenser, a mechanical stirrer and a thermometer probe, and 120.58 g of hexamethyldisilazane (0.75 mol) are run in over 1 hour. The reaction medium is left in contact at 130° C. for 24 hours. After returning to ambient temperature, a solution of protected allyloxybenzoic acid in solution of hexamethyldisilazane is obtained.

It is possible to purify the protected product by distillation under vacuum.

1.3. Hydrosilylation of Protected Allyloxybenzoic Acid 87.01 g of the solution of protected acid obtained in 1.2. (0.15 mol of protected acid) and 31.0 mg of platinum catalyst are introduced into a 250 ml three-necked flask, under an argon head space, equipped with a reflux condenser, a dropping funnel, a mechanical stirrer and a thermometer probe. The reaction medium is brought to 80° C. and stirring is begun. 35.03 g of oil with structure A (0.13 mol of SiH functional group) are then run into the reaction medium over 45 minutes. The reaction medium is subsequently left in contact for 16 hours. During this contact time, 7.5 mg of $PtCl_2(PhCN)_2$ are added.

2% by mass of carbon black is added at 85° C. and is left in contact for 16 hours. After returning to ambient temperature, the reaction medium is filtered through a board filter under pressure and then the reaction mass is returned to a single-necked round-bottomed flask equipped with a magnetic bar. The product is isolated by devolatilization at 120° C. under a vacuum of 1 mmHg.

The product thus isolated is deprotected by hydrolysis with distilled water (200 ml), which is run onto the product to be deprotected over 1 h 15, and heating at 90° C. for 16 hours. The medium becomes off white. The water is removed at 110° C. under a vacuum of 2 mmHg over 4 h 15. 58.40 g of hydrosilylated oil of structure B are then obtained.

1.4. Purification of a Silicone Oil B Comprising Benzoic Acid Functional Groups

The starting material is an oil which is 92% pure on a mass basis with 8% on a mass basis composed of ungrafted oligomers originating from ungrafted allyloxybenzoic acid or isomers of allyloxybenzoic acid. Several purification techniques are possible among the various purification techniques. The method employed here is fractional precipitation. It consists in dissolving the grafted oil obtained in 1.3. in a hot alcohol. This alcohol can be more particularly methanol. The polymer is then precipitated by addition of water of basic pH. The operation is repeated a further time. The third operation consists in dissolving the silicone polymer under hot conditions in methanol and in then adding water at acidic pH. The polymer thus purified is heated at 115° C. under a vacuum of 20 mmHg in order to remove the residual water or alcohol. The product is finally placed in an oven at 100° C. at atmospheric pressure. A polymer with a purity of greater than 95% by weight is obtained.

Example 2

Preparation of a -POS Precursor (C) of a Peroxide POS According to the Invention, this Precursor Being a Polydimethylsiloxane Comprising Trimethylsilyl Ends Carrying Functional Substituents of -propyl-succinic anhydride Type Starting silicone oil:

structure A

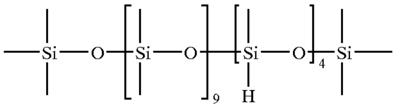

Final silicone oil:

structure C

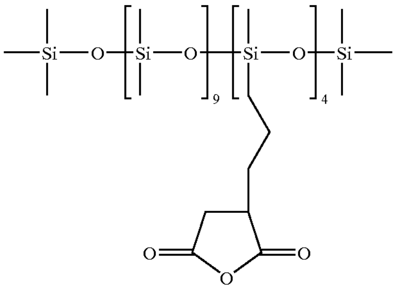

Synthesis of the Silicone Oil C Comprising Succinic Anhydride Units 119.53 g of allylsuccinic anhydride, with a purity of more than 99 mol % (0.85 mol), and 44.2 mg of Karstedt platinum, comprising 10% by mass of platinum, are introduced into a 500 ml three-necked flask equipped with a mechanical stirrer, a reflux condenser, a dropping funnel and a temperature probe while flushing with argon. The reaction medium is brought to 90° C. with stirring and then 175.53 g of oil with structure A (0.66 mol of SiH functional group) are run in over 1 h 25. The reaction medium is left in contact at 90° C. with stirring for 4 hours. The reaction medium is subsequently treated with 2% by weight of carbon black at 70° C. for 4 hours. After returning to ambient temperature, the reaction medium is filtered through a board filter under nitrogen pressure. After having placed the reaction medium in a single-necked round-bottomed flask equipped with a magnetic bar, the grafted silicone polymer is isolated by devolatilizing the excess oligomer by heating at 180° C. under a vacuum of 2 mmHg. A silicone oil with structure C and with a purity equal to 94% by weight is obtained.

In order to purify this product to a purity of more than 99% by weight, the product was devolatilized using a diffusion pump under a vacuum of $10^{-3}$ mmHg while heating the polymer from 120 to 160° C. for 6 hours. A silicone polymer grafted with propylsuccinic anhydride is then obtained with a purity of greater than 99% by weight. Infrared analysis shows that the anhydride is not opened during the treatments described in the examples.

Example 3

Preparation of a -POS Precursor (E) of a Peroxide POS According to the Invention, this Precursor Being a Polydimethylsiloxane Comprising Trimethylsilyl Ends Carrying Functional Substituents of -propyl-succinimide-benzoic Type Starting silicone oil:

structure D

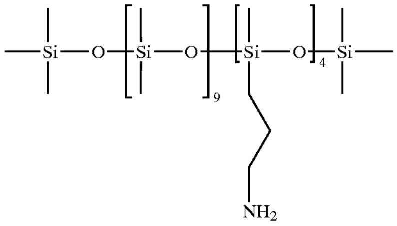

Final silicone oil:

structure E

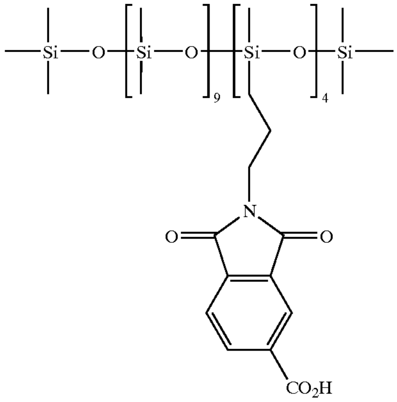

3.1. Preparation of Silicone Comprising an Amine Functional Group by Coequilibration 50 g of aminopropyldimethoxymethylsilane (0.3 mol) are introduced into a three-necked flask, under an argon head space, equipped with a devolatilization system, a mechanical stirrer, a dropping funnel and a temperature probe, and an amount of water of 27.6 g (1.5 mol) is added over 1 hour. The system is brought to 110° C. and is devolatilized under 11 mmHg in order to collect the amount of methanol of 19.2 g.

After returning to [lacuna] temperature and having replaced the distillation system by a reflux condenser, 30.5 g of octamethyltetrasiloxane (0.1 mol, i.e. 10% excess), 34.3 g of a short silicone oil with 6 silicons of formula $M_2D_4$ and 5.3 g of potassium siliconate comprising 15% by weight of potassium hydroxide (80 ppm), in addition to 35.1 g of hydrolyzed silane obtained above, are introduced. After heating at 130° C. for 6 hours while stripping with nitrogen, the reaction mixture is neutralized by addition of 12.3 g of a solution of silicated ester of phosphoric acid comprising 9% by mass of phosphoric acid. Following the neutralization, the medium is left in contact for 30 minutes at 80° C. and then devolatilization is carried out under 2 mmHg at 170° C. 113.5 g of silicone oil with structure D are obtained.

3.2. Formation of a Silicone E Comprising Acid and Imide Functional Groups 28.8 g of trimellic anhydride (0.15 mol) and 75 g of toluene are charged to a three-necked round-bottomed flask, under an argon head space, equipped with a reflux condenser, a mechanical stirrer, a dropping funnel, a thermometer probe and a Dien & Stark apparatus, and 50.0 g of silicone oil comprising an amine functional group with structure D (0.15 mol of amine functional group) are run in over 1 hour. The reaction mixture is left in contact at ambient temperature for 1 hour and then the reaction mixture is brought to reflux for 5 hours; during the time, removal of the water is monitored. After returning to ambient temperature, the reaction mixture is filtered through a board filter under pressure. After having placed the reaction mixture in a single-necked round-bottomed flask equipped with a magnetic bar, the solvent is devolatilized by heating at 110° C. under a vacuum of 10 mmHg. A polymer with structure E is obtained with a purity of 95% by weight.

Example 4

Preparation of a -POS Precursor (F) of a Peroxide-comprising POS According to the Invention, this Precursor Being a Polydimethylsiloxane Comprising Trimethylsilyl Ends Carrying Functional Substituents of Aminoethylaminopropyl ($H_2N—(CH_2)_2—NH—(CH_2)_3—$) Type Example 3 is repeated apart from the difference that the aminopropyldimethoxymethylsilane employed in part 3.1. is replaced for aminoethylaminopropyldimethoxymethylsilane and, ultimately, a POS precursor or silicone oil F is obtained:

[lacuna]

Example 5

Preparation of a Peroxide-comprising POS in which the Fpo (—O—O—) Functional Groups of the E Substituents Are Included in Percarboxylic Acid Residues

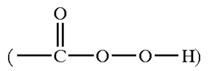

from the Pos Precursor According to Example 2 (Pendant Anhydride Residues)

5.1. Test

The following operations are carried out in a weighing tube:

- 250 mg of silicone oil C of Example 2, i.e. 0.615 mmol of anhydride functional groups (4 functional groups per polymer), are weighed out,
- 0.5 ml of ethyl acetate (AcOEt) is added,
- 45 mg of 70% hydrogen peroxide, i.e. 0.926 mmol (1.5 equivalents excess with respect to the stoichiometry, which is 1 $H_2O_2$ per anhydride), are weighed out,
- 1 drop of KOH (1N) is introduced,
- a small magnetic bar is added,
- the mixture is stirred at ambient temperature for 1 hour.

5.2. Treatment

- 3 ml of AcOEt are added
- the mixture is transferred into a small 50 ml separating funnel
- 3 ml of deionized water comprising 100 g/l of ammonium sulfate are added the mixture is agitated and allowed to separate by settling, and the lower aqueous phase is removed the operation is restarted a further 2 occasions the organic phase is recovered in a 50 ml beaker 1 g of anhydrous $MgSO_4$ is added the solution is transferred into a tared 50 ml round-bottomed flask and the separating funnel and $MgSO_4$ are rinsed twice with 1 ml of AcOEt the solution is evaporated to dryness on a rotary evaporator, bath at a maximum of 35° the residue is evaporated for a few minutes under pump vacuum under cold conditions (ambient temperature)

the product obtained is weighed.

5.3. Quantitative Determination of Peroxides in the Peroxide-comprising Silicone Oil Apparatus: Metrohm Dosimat 665

5.3.1. Procedure

The following operations are carried out in a 50 ml Erlenmeyer flask:

approximately 250 mg of peroxide-comprising oil are weighed out the following are added:

20 ml of 80/20 acetic acid/$H_2O$ mixture and dissolution is allowed to take place or, better still, 20 ml of pure acetic acid, dissolution is allowed to take place and then a small amount of water is added 1 spatula (1 g) of $NaHCO_3$ is added (inerting by $CO_2$)

1 spatula (1 g) of potassium iodide is added the flask is stoppered and placed in darkness for a minimum of 20 minutes.

The contents of the Erlenmeyer flask are transferred into a 150 ml beaker (tall form):

rinsing is carried out with 50 ml of distilled water acetone is added (maintenance of the solubility and antifoaming)

a magnetic bar is added and the iodine released is quantitatively determined with a 0.1 N sodium thiosulfate solution.

5.3.2. Calculations

Number of mmol of $H_2O_2$=V ml×CO3×CO2/COO×CO1
Weight % of $H_2O_2$=Number of millimoles quantitatively determined×34/1000

1 equivalent $H_2O_2$=1 equivalent R—CO—O—OH 5.3.3. Expression of the Results: Weight % as $H_2O_2$ Equivalent Given that the -POS precursor (oil C) prepared in Example 2 comprises the E substituents each carrying an anhydride and that the reaction is regarded as total (oxidation yield=100%), then, for one mol of oil (C), 4 mol of $H_2O_2$ are reacted, i.e. as % by weight: 1 mol of oil (C)=1628 g, for 4 mol of $H_2O_2$=136 g, i.e. 8.35 weight % of $H_2O_2$.

5.3.4. Result

The content of peracid in the oxidized oil C is 6.2%, i.e. an oxidation of 6.2/8.35×100=74%.

Example 6

Preparation of a Peroxide-comprising POS in which the Fpo (—O—O—) Functional Groups of the E Substituents are Included in Percarboxylic Acid Residues

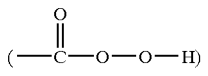

from the POS Precursor According to Example 2 (Pendant Anhydride Residues)

The following are charged to a 100 ml round-bottomed flask:

15 g of oil C of Example 2 (36.9 mmol of anhydride)

30 g of ethyl acetate 2.7 g of 0 70% hydrogen peroxide (55.6 mmol (×1.5))

0.6 ml of N KOH (0.6 mmol).

A magnetic bar is added and stirring is begun. There is an immediate exotherm and the temperature reaches 31° C.

A crystallizing dish of cold water is installed to bring the temperature to ambient temperature.

The mixture is maintained for 1 hour.

The mixture is decanted into a 100 ml separating funnel and the round-bottomed flask is rinsed twice with 10 ml of AcOEt.

The organic phase is washed 8 times with 20 ml of deionized water comprising 100 g/l of ammonium sulfate: the disappearance of the hydrogen peroxide in the aqueous phases is monitored by an indicator paper for peroxides.

The organic phase is dried over anhydrous $MgSO_4$.

The organic phase is filtered through a sintered glass filter.

The organic phase is decanted into a 100 ml round-bottomed flask and the separating funnel and the sintered glass filter are rinsed. The organic phase is evaporated to dryness on a rotary evaporator, bath at a maximum of 35°.

The residue is dried under pump vacuum for 3 hours at ambient temperature.

Weight obtained: 15.4 g

Content of peracids: 5.46% (expressed as $H_2O_2$)

Oxidation: 65%

Example 7

Study of the Stability on Storage of Peroxide-comprising POSs According to the Invention The POS used is prepared according to the methodology given in Example 6.

The product is stored dried at 5° C. and 25° C.

Samples are withdrawn over time and the peroxides therein are quantitatively determined as describes above in 5.3.

7.1. Storage at 5° C. from 0 to 30 Days

The results are given by Table 1 below.

TABLE 1

| Duration (d) | % Peracids | % Oxidation |
|---|---|---|
| 0 | 5.72 | 100.0 |
| 2 | 5.48 | 95.8 |
| 6 | 5.08 | 88.8 |
| 13 | 3.82 | 66.8 |
| 22 | 2.90 | 50.7 |
| 30 | 1.70 | 30.0 |

7.2. Storage at 5° C., 0, 11 and 22 Days

The results are given by Table 2 below.

TABLE 2

| Duration days | % Peracids 5° C. | % Oxidation 5° C. |
|---|---|---|
| 0 | 5.46 | 100.0 |
| 11 | 4.24 | 74.1 |
| 22 | 2.85 | 49.8 |

Example 8

Preparation of a Peroxide-comprising POS in which the Fpo (—O—O—) Functional Groups of the E Substituents are Included in Percarboxylic Acid Residues

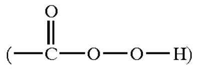

from the POS Precursor According to Example 2 (Pendant Anhydride Residues)

Example 5 is repeated apart from the difference that KOH is not used.

Results

Content as $H_2O_2$ equivalent=0.59%

Oxidation: 7%

Example 9

Preparation of a Peroxide-comprising POS in which the Fpo (—O—O—) Functional Groups of the E Substituents Are Included in Percarboxylic Acid Residues

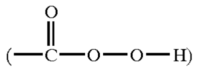

from the POS Precursor According to Example 2 (Pendant Anhydride Residues)

Example 6 is repeated apart from the difference that the drop of KOH is replaced by a drop of $H_3PO_4$ (85% in water)

Results:

Content as $H_2O_2$ equivalent=1.03%

Oxidation: 12%

Example 10

Preparation of a Peroxide-comprising POS in which the Fpo (—O—O—) Functional Groups of the E Substituents Are Included in Percarboxylic Acid Residues

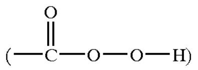

from the POS Precursor According to Example 1 (Pendant Benzoic Residues)

10.1. Test

The following operations are carried out in a weighing tube:

250 mg of silicone oil B of Example 1, i.e. 0.578 mmol of acid functional groups (4 functional groups per polymer), are weighed out 0.5 ml of ethyl acetate (AcOEt) is added 84 mg of 70% hydrogen peroxide, i.e. 1.729 mmol (3 equivalents excess with respect to the stoichiometry, which is 1 $H_2O_2$ per acid), are weighed out 1 drop of $H_2SO_4$ (95% in water) [lacuna]

a small magnetic bar is added the mixture is stirred at ambient temperature for 2 hours in the presence of an excess of anhydrous $MgSO_4$ (>100 mg).

10.2. Treatment 3 ml of AcOEt are added the mixture is transferred into a small 50 ml separating funnel 3 ml of deionized water comprising 100 g/l of ammonium sulfate are added the mixture is agitated and allowed to separate by settling, and the lower aqueous phase is removed the operation is restarted a further 2 occasions the organic phase is recovered in a 50 ml beaker 1 g of anhydrous $MgSO_4$ is added the solution is transferred into a tared 50 ml round-bottomed flask and the separating funnel and $MgSO_4$ are rinsed twice with 1 ml of AcOEt the solution is evaporated to dryness on a rotary evaporator, bath at a maximum of 35° the residue is evaporated for a few minutes under pump vacuum under cold conditions (ambient temperature)

the product obtained is weighed.

10.3. Result

Content of peracid: 0.66%

Oxidation: 9%

Example 11

Evaluation of the Bleaching Power of the Peroxide-comprising POS of Example 6

11.1. Method in Development for Determining the Bleaching Power with Respect to Hydroxyapatite HAP Powder 11.1.1. Principle Measurement of the bleaching power of oxidizing compounds with respect to a hydroxyapatite HAP powder contaminated beforehand by a hot tea solution.

Bleaching power quantified by calorimetric measurements carried out on a Minolta CR-241 device.

11.1.2. Equipment

A—Small Items

Filter paper, “rapid filtrations” No. 41 from Whatman, for the filtration of the tea solution and for the recovery of the contaminated powder Filter paper, GF/C, diameter of 47 mm, from Whatman, used for the recovery of the bleached powder Büchner funnel (diameter of 100 or 160 mm), 2 l vacuum filter flask, vacuum pump or filter pump with a differential manometer, and rubber seals Pots made of crystal polystyrene (transparent), capacity of approximately 40 ml B—Devices Minolta CR-241 colorimeter Promax 2020 to-and-fro stirrer Oven (50 to 100° C.)

C—Products

Deionized water

Lipton Yellow Tea, Grade No. 1

Bio-Rad hydroxyapatite HAP powder

Solution or oxidizing agent 11.1.3. Procedure

A—Contamination of the HAP Powder a—Measurement of the initial whiteness of the powder A measurement of the initial whiteness of the HAP powder is carried out. It is carried out on a Minolta CR-241 device. Three measurements are made in order to obtain a mean value of Lo, ao, bo.

b—Brewing of the tea and filtration 500 ml of deionized water and 10 cut tea bags are introduced into a 1 000 ml beaker (C=~40 g/l) and brought to ~80° C. with mechanical stirring (200 rev/min) for 90 minutes.

The stirring and the heating are halted. Once the medium has cooled to approximately 40° C. (time necessary=~90 min), it is filtered under vacuum.

The filtrate (=contaminating tea solution) is recovered. Its volume is readjusted to 500 ml with deionized water.

c—The contamination 7.5 g of HAP powder are introduced into the tea solution.

The combined mixture is again brought to ~80° C. with stirring for 45 minutes.

The heating and the stirring are halted and the medium is cooled by the surrounding air (to ~40° C.) before being filtered under vacuum.

The powder is washed with three times 20 ml of hot deionized water until the filtrate is colorless.

The filter and the powder are placed in the oven [T=50–100° C.] until the water has completely evaporated.

The powder, recovered in the form of agglomerates, is ground using a pestle and mortar.

Its new whiteness is measured (Ls, as, bs) with a Minolta CR-241.

B—Bleaching of the Contaminated HAP Powder 6.5 g of oxidizing solution (comprising the equivalent of 0.3% of $H_2O_2$) and 50 mg of contaminated HAP powder are decanted into a flask made of crystal polystyrene with a capacity of approximately 40 ml.

The combined mixture is placed on the Promax 2020 to-and-fro stirrer for the desired time (15 min, 30 min. 1 h, 2 h, and the like) at the rate of 250 to-and-fro movements.

The medium is subsequently diluted by addition of 20 ml of ethanol before being filtered.

The powder is washed with three times 30 ml of ethanol.

The combined filter+bleached powder is dried in the open air under a hood.

The new whiteness of the bleached powder can be measured (Lc) and the bleaching power of the oxidizing solution can be calculated.

11.1.4. Calculations

The calculation of the bleaching power of the oxidizing compound is made from the value L given by the calorimeter obtained after the various treatments of the HAP powder.

L* represents the lightness of the sample, its values ranging between 0 and 100.

The various values are thus defined:

Lo, initial lightness before contamination

Ls, lightness after contamination

Lc, lightness after bleaching.

The bleaching power is calculated as follows: Bleaching power:

Bleaching power:

$$Pb = \frac{Lc - Ls}{Lo - Ls} \times 100$$

11.2. Measurement of the Whiteness Lc Obtained in the Test Described in 11.1. Above with the Peroxide-comprising POS of Example 6

11.2.1. The Bleaching of the HAP Powder According to Part 11.1.3.B Above Is Carried Out as Follows 6.5 g of oxidizing preparation comprising 300 mg of peroxide-comprising POS according to Example 6 dispersed in 6.2 g of water inverted by manual agitation and 50 mg of contaminated HAP-powder are decanted into a flask made of crystal polystyrene with a capacity of 40 mg.

The procedure is subsequently as indicated in part 11.1.3.B.

11.2.2. Results

TABLE 3

| Time (min) | Lc with water control | Pb* | Lc with peroxide-comprising POS | Pb* |
|---|---|---|---|---|
| 0 | 50 | 0 | 50 | 0 |
| 15 | 49 | 0 | 69 | 45 |
| 60 | 49 | 0 | 69 | 45 |
| 120 | 49 | 0 | 70 | 48 |

$$*Pb = \frac{Lc - Ls}{Lo - Ls} \times 100$$

$Ls = 50$ and $Lo = 92$

What is claimed is:

1. Polyorganosiloxanes (POSs) comprising siloxane units having the following formula $$R^1_3SIO—[SiR^2_2O]_m—[Sir^2EO]_n—[Sir^2GO]_o—SiR^3_3 \quad (II)$$

wherein

E, which is identical or different, is a monovalent functional substituent selected from the group consisting of (cyclo)aliphatic hydrocarbonaceous groups, aromatic, hydrocarbonaceous groups and heterocyclic hydrocarbonaceous groups, carrying one or more functional group Fpo of the following formula,

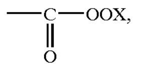

wherein

X is hydrogen, a halogen atom, or a cation forming a salt with the acyl peroxide anions, G, which is identical or different, is a functional substituent comprising one or more Fpo-stabilizing functional group Fstab, which are identical to or different from one another, capable of bonding via weak bonds with the Fpo functional group, the concentration {Fpo} of Fpo functional groups, expressed by the ratio $$\{Fpo\} = \frac{Fpo \text{ number}}{\text{Total number of silicon atoms in the } POS},$$

is greater than 0, and the concentration {T and/or Q} as mol %, of units selected from the group consisting of T units and Q units, is from 0 to 20, T units being defined as siloxane units wherein a+b+c=1, $R^1$ and $R^3$, which are identical or different, are hydrogen, a hydroxyl or a monovalent a hydrocarbonaceous group, $R^2$, which is identical or different, is hydrogen, hydroxyl, or a monovalent a hydrocarbonaceous group, wherein $3 \leqq m+n+o \leqq 50$, $1 \leqq m \leqq 100$, $1 \leqq n \leqq 10$, and $1 \leqq o \leqq 10$.

2. Polyorganosiloxanes according to claim 1, whereat least one E substituent further comprises one or more Fpo-stabilizing functional group Fstab, which are identical to or different from one another, and capable of bonding via weak bonds with the Fpo functional group.

3. Polyorganosiloxanes according to claim 1, wherein $0.1 \leqq \{Fpo\} \leqq 0.6$.

4. Polyorganosiloxanes according to claim 1, wherein X is an elements from columns Ia and IIA of the Periodic Table.

5. Polyorganosiloxanes according to claim 1, wherein Fstab generates weak bonds (hydrogen bonds) with Fpo functional groups, and is selected from the group consisting of:

functional units comprising nitrogen, oxygen, fluorine, sulfur or phosphorus, cationic units, chelating units comprising one or more ether or amine functional group, phosphonate chelating units, and sulfonate chelating units.

6. Polyorganosiloxanes according to claim 1, wherein Fstab generates weak bonds (hydrogen bonds) with Fpo functional groups, and is selected from the group consisting of carboxylic units, carboxylate units, amide units, imide units, sulfonamide units, hydroxyl units, alkoxy units, amine units, organofluorinated units, and quaternary ammoniums units.

7. Polyorganosiloxanes according to claim 1, wherein $5 \leqq m+n+o \leqq 20$, $1 \leqq m \leqq 10$, $2 \leqq n \leqq 4$, and $2 \leqq o \leqq 4$.

8. Polyorganosiloxanes according to claim 1, wherein:

$R^1$ and $R^3$ $C_1$–$C_3$ alkyl, $R^2$ is a C1–C3 alkyl, and

E carries Fpo and Fstab functional groups.

9. Polyorganosiloxanes according to claim 8, wherein $R^1$, $R^2$ and $R^3$ are methyl groups.

* * * * *